Jan. 6, 1931.     W. VAUGHAN ET AL     1,788,136
ASSEMBLING APPARATUS
Filed May 18, 1927     2 Sheets-Sheet 1
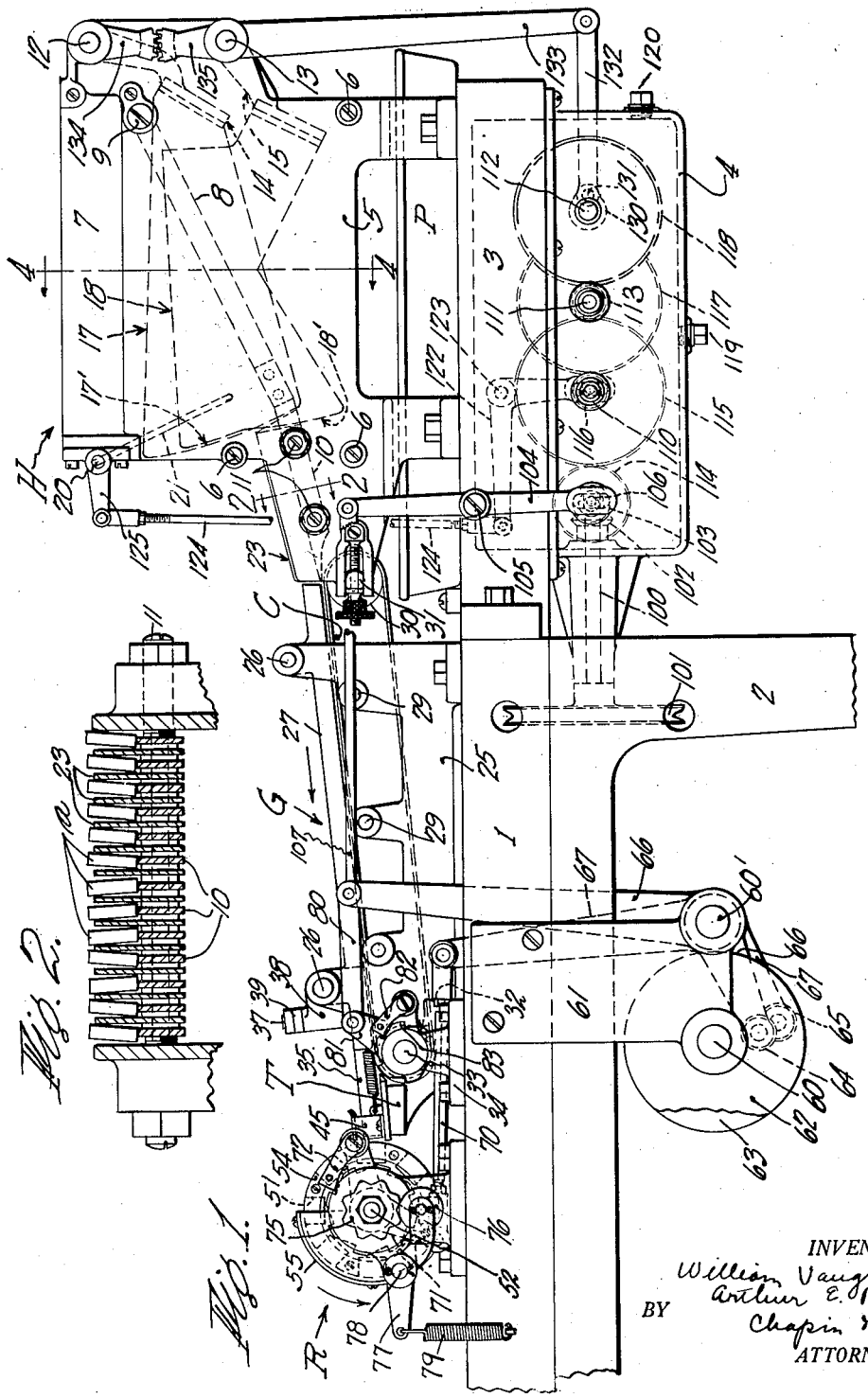
INVENTORS
William Vaughan and
Arthur E. Brown
BY Chapin & Neal
ATTORNEYS.

Jan. 6, 1931. W. VAUGHAN ET AL 1,788,136
ASSEMBLING APPARATUS
Filed May 18, 1927   2 Sheets-Sheet 2
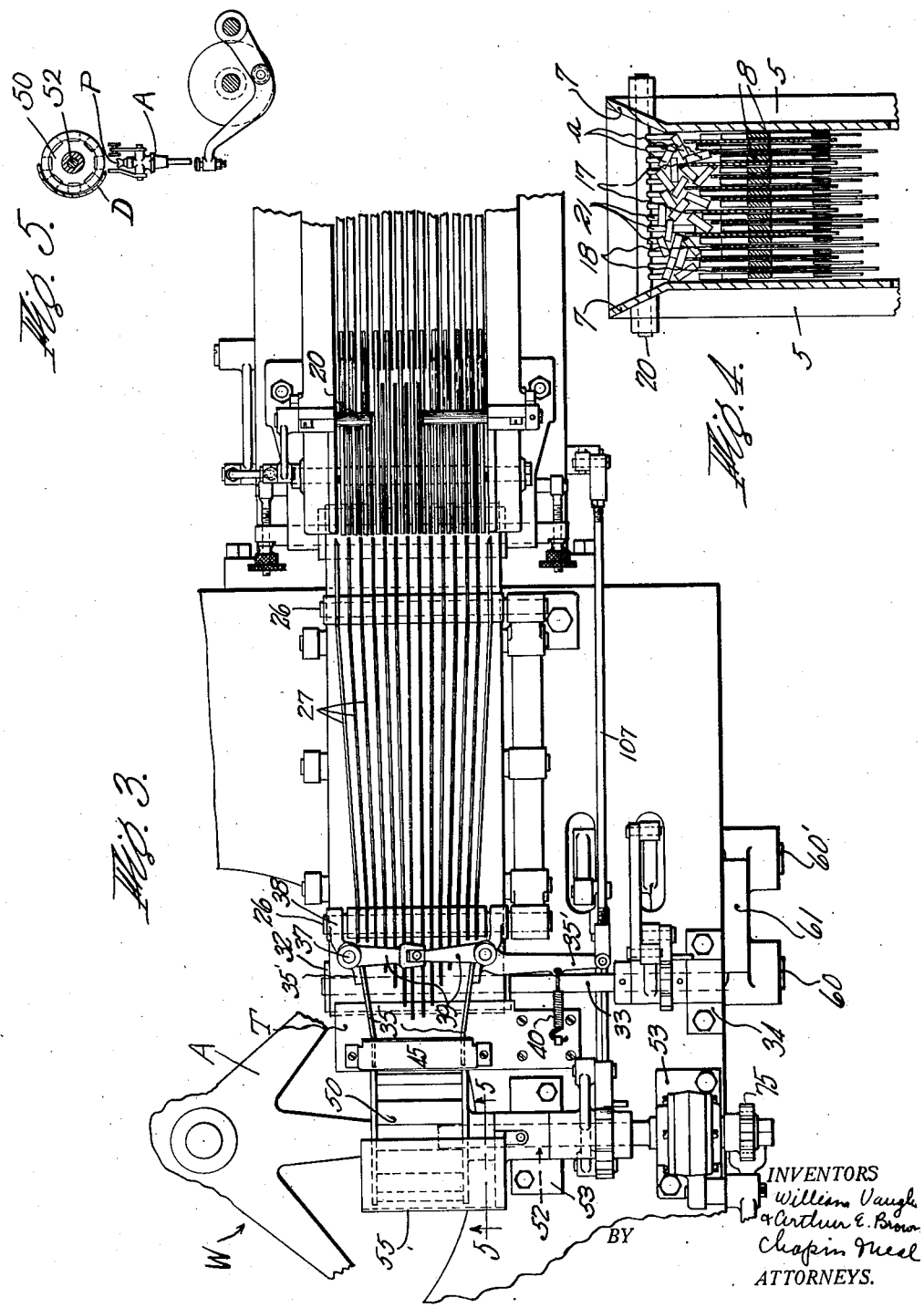

Patented Jan. 6, 1931

1,788,136

UNITED STATES PATENT OFFICE

WILLIAM VAUGHAN AND ARTHUR E. BROWN, OF LONDON, ONTARIO, CANADA, ASSIGNORS TO PACKAGE MACHINERY COMPANY, OF SPRINGFIELD, MASSACHUSETTS, A CORPORATION OF MASSACHUSETTS

ASSEMBLING APPARATUS

Application filed May 18, 1927. Serial No. 192,437.

This invention relates to improvements in apparatus for assembling a plurality of articles in stacked relation.

According to the novel features of the invention, we provide an apparatus which comprises mechanism for sorting the articles so that they are disposed in similar relative positions and other mechanism for conveying the sorted articles and arranging them in the form of a stack for delivery into a receiver mechanism.

The apparatus is adapted for broad application wherever it is desired to arrange articles in groups or stacks and the novel features thereof may be varied within wide limits to adapt the invention for use in connection with articles of various sizes and shapes.

The invention in the form at present preferred will be described in connection with the assembling and stacking of disc like articles such as candy lozenges or the like. The drawings illustrating the invention are merely intended to illustrate the important and novel features thereof and a machine embodying the features may be modified or changed to enable those skilled in the art to practice the same.

In the drawings:

Fig. 1 is a side elevational view of an apparatus embodying the features of the invention;

Fig. 2 is a cross sectional elevational view taken on the line 2—2 of Fig. 1;

Fig. 3 is a partial plan view of the apparatus shown in Fig. 1.

Fig. 4 is a sectional elevational view taken on the line 4—4 of Fig. 1; and

Fig. 5 is a sectional elevational view taken on the line 5—5 of Fig. 3.

In general, the apparatus comprises a hopper H adapted to receive a batch of articles, a guide chute G and conveyor C for conveying sorted articles from the hopper, a table T for receiving groups of articles and a receiver R for receiving a stack of articles.

For the purposes of illustration, we have shown the apparatus in connection with a portion of a wrapping machine disclosed in the patent to Smith and Phelon No. 1,269,969 dated June 18, 1918. The apparatus to be described is well adapted to assemble and deliver stacks of articles to said machine or the like but it will be understood that it need not necessarily be used therewith for stacks may be delivered therefrom to any packing apparatus or other machine as may be desired. A table or bed of said wrapping machine is represented at 1 and is suitably supported by side frames 2 in the usual manner.

For supporting the apparatus a bed or table 3 is provided which may be secured to the table 1 and has secured to its lower side a casing 4 for enclosing certain parts of the operating mechanism as will later be described.

Side frames 5, secured to and extending upwardly from the table 3, are held rigidly in a spaced relation by suitable tie rods or bolts 6 and preferably flare outwardly at their upper sides as indicated at 7.

Bars 8 forming a bottom for the hopper and for supporting articles are held in a spaced relation at their upper ends by tie rods 9 which are carried by the side frames 5 and are preferably disposed so as to slope downwardly towards the delivery end of the hopper. These bars may be of any desired thickness depending upon the articles to be sorted and have fixed to their forward lower ends other supporting bars 10 which are preferably thinner than the bars 8 and which are held in their spaced apart relation by other tie rods 11.

Oscillatable shafts 12 and 13 are suitably mounted in the side rear of the hopper frames and have fixed thereto lever members 14 and 15 each of which carries agitator members in the form of plates 18 and 17. These plates, as will be seen in Fig. 4, interleave with or are disposed in the slots or spaces between the bars 8 and as the shafts 12 and 13 are oscillated, are raised and lowered with respect to the bars. The plates 17 carried by the lever 14 and the plates 18 fixed to the lever 15 are arranged to work in alternate slots formed by the bars 8 so that for instance as one set of plates such as 17 is being raised or lowered the other plates 18 therebetween may be moved in a reverse direction. This is advantageous because by the raising and lowering movements the mass of articles supported thereby is jogged up and down and moved about relative to one another so that they fall edgewise between plates 17 and 18 and onto the supporting bars 8 as shown in Fig. 4.

The range of movement of the plates 17 and 18 is preferably such that their upper edges will not, when in a lowered position, pass below the upper side of the bars so that at all times they function as guides between the bars to form channels for the articles resting on the bars 8 and since the bars 8 slope downwardly the articles will tend to roll from the hopper.

An oscillatable shaft 20 suitably mounted at the upper side of the hopper has fixed thereto a plurality of downwardly depending prongs or fingers 21 which work in the channels between the plates 17 and 18 above the bars 8, and as the shaft is oscillated the fingers act on the articles in the hopper to prevent their jamming together and tend to assist the sorting or arranging of the articles on the supporting bars. The ends of the prongs 21 are spaced from the bars 8 a sufficient distance to allow one article only to pass thereunder in each of the channels, as will be seen by reference to Fig. 1.

The supporting bars 10 previously referred to are preferably somewhat thinner than the bars 8 and have their ends joined to the lower ends of said bars 8 so as to provide a continuation of the said bars. Guide members 23 in the form of plates or thin bars are also supported by the bolts 11 and are arranged between the bars 10 to form channels which are in line with the channels between the plates 17 and 18. It will be noted that the rear ends of the guide members 23 are curved to correspond with curved ends 17' and 18' of the movable agitator plates 17 and 18. This permits the adjacent ends of the guides and plates to be kept sufficiently close together at all times to prevent articles being caught therebetween to cause breakage. A receptacle in the form of a pan P is provided for fitting between the frames 5 and supported by the member 3 and serves to catch fragments or dust which may fall downwardly from the hopper.

The chute G will now be described. A frame 25 supported by the bed 1 has fixed thereto supporting rods 26 which carry a plurality of depending guide plates 27, which have their ends adjacent the hopper in alignment with the plates 23, previously described. These plates 27 are preferably thinner than the plates 23 and are arranged to converge towards the receiver mechanism R so as to provide a plurality of gradually narrowing channel guideways for the articles which have their entrances in alignment with the channels formed by the plates 23.

A conveyor C in the form of an endless belt is located below the plates 27 and has its upper run supported at intervals by rollers or supporting bars 29 fixed to the member 25. The belt C passes over an idler pulley 30 mounted for rotation on a shaft 31 adjustable in the ordinary way in the hopper frames 5 and is driven by a driving pulley 32 fixed on a rotatable shaft 33 carried by a bearing bracket 34 fixed to the bed. The belt is preferably moved intermittently or in a step by step manner in the direction of the arrow so as to urge the articles along through their respective gradually narrowing channels formed by the plates 27 and onto the table T. It will be noted that the length of the plates 27 varies from the longer ones at the central part of the guideway or chute to the shorter ones at the outside thereof so that as the articles are moved along their respective channels they may run out of the channels so as to be moved into closely stacked relation by means now to be described.

Side guides or pressers 35 which overlie the table T and are in alignment with the endmost the table T and are in alignment with the members 27 are fixed to suitable levers 35' carried by the lower ends of vertical oscillatable shafts 37. These shafts are carried in bearings 38 fixed to the tie rod or shaft 26 and levers 39 at the upper ends of these shafts are connected for relative movement and serve to equalize the movement of the shafts and guides 35 so that as they are pulled towards one another by a spring 40 to act on the ends of a stack of articles they will also centralize or align the stack with respect to the stack receiving mechanism. One of the levers 35 is connected to an operating mechanism later to be described so that the guides 35 may be opened simultaneously to receive a group of articles and subsequently moved towards one another by the spring to press the group of articles into closely stacked relation. A guide 45 carried by the table T is adapted to guide a stack of articles or to prevent an upward movement thereof as it passes from the receiving table T to the stack receiving mechanism now to be described.

The stack receiving mechanism comprises a wheel or barrel 50 which has a plurality of stack receiving pockets 51 on the periphery thereof and is fixed to a rotating shaft 52 rotatable in bearing brackets 53. Suitable end rings or plates 54 at opposite sides of the wheel 50 provide ends for the pockets to hold the stacks therein and a circular guide 55 fixed to the bracket 53 extends partially round the wheel to retain the stacks of articles in the pockets of the wheel as it is rotated. The wheel is preferably operated in a step by step manner or intermittently so as to locate its pockets in receiving position in alignment with the table T for receiving stacks of articles and for locating another of its pockets in proper position with respect to a receptacle or a pocket of a wrapping machine wheel D such as is illustrated in the Smith and Phelon patent above referred to. The step by step motion also allows time for the inspection of stacked articles in the pockets of the receiving wheel and permits the removal of unsuitable stacks or of broken articles therefrom.

In lieu of the wrapping wheel shown, the stacks of articles may be delivered from the receiving wheel onto a pocketed conveyor belt or into compartments of a container or the like, the wrapping feature being shown merely to disclose that it is possible to assemble articles in stacked relation and deliver them to a wrapping machine without handling. The various operating mechanisms will now be described.

A shaft 60, rotatable in a suitable bearing member 61, fixed to the bed 1 has a pair of cams 62 and 63 fixed thereto which are provided with suitable grooves (not shown) for receiving cam rolls 64 and 65 of levers 66 and 67 so as to give said levers a to and fro rocking motion on their pivots 60'. The cam grooves are not shown as they may be of ordinary formation to rock said levers at any desired rate and may be arranged to time their operation, as may be desired with respect to the other parts of the apparatus.

The lever 67 is connected by a link or rod 70 to the lower end of a bell crank 71 oscillatable on the shaft 52 and a pawl 72 on the upper arm of said crank operates on the teeth of a ratchet wheel 74 fixed to said shaft so that as the lever is rocked back and forth the wheel 50 is moved in a step by step manner in the direction of the arrow.

To insure a proper registration or alignment of the pockets of the wheel with the table or other parts of the machine, a notched wheel 75 on the end of shaft 52 rides upon a roll 76 carried on an end of lever 77 pivoted at 78 and which is urged downwardly by a spring 79. If the ratchet mechanism should fail to properly register the pocket of the wheel, the spring actuated lever will force the roll into a notch of the wheel and bring the shaft and wheel to rest at a desired position. The lever 66 is connected by a link 80 to a lever 81 oscillatable on shaft 33 and a pawl 82 pivoted on said lever works on a ratchet wheel 83 fixed to said shaft so that a swinging motion of said lever will intermittently rotate said shaft and urge the belt C along in a step by step manner.

The shaft 60 may be a part of and driven from the mechanism of a wrapping machine or may be independent thereof and driven independently thereof as may be desired.

A shaft 100 rotatably carried by the member 4 has a driving pulley 101 on its outer end and a bevel gear 102 on its inner end in engagement with a mating gear on a shaft 103 mounted for rotation in the member 4. If desired, the shaft 100 may be connected to and driven from shaft 60.

A lever 104 mounted at 105 for a swinging motion has a slotted lower end in engagement with a pin 106 mounted in the well known manner in an eccentric relation on the end of shaft 103 so that as said shaft rotates the lever will be rocked back and forth. A rod 107 connects the upper end of this lever 104 with one of the levers 35' over the table T previously described and moves the guide members 35 against the action of the spring 40.

Other shafts 110, 111 and 112 rotatably carried by the member 4 are suitably geared together and to the shaft 103 by gears 113, 114, 115, 116, 117 and 118 so that they may be rotated by shaft 103 at the desired speeds. The member 4 may be provided with a drain and overflow outlets 119 and 120 and used as a gear case to facilitate the lubricating of the gearing.

A lever 122, pivoted at the rear of the member 3 as shown in dotted lines in Fig. 1, has its lower end in engagement with an eccentric pin or stud on the rear end of shaft 110, like the shaft 103 and lever 104, and its upper end is connected by a link 124 to a lever 125 fixed on the rear end of the oscillatable shaft 20. This lever 122 is rocked back and forth as is the lever 104 and the shaft 20 is thereby given its oscillatory movements to work the fingers 21 back and forth between the plates 17 and 18.

A crank 130 fixed to the rear end of shaft 112 has a crank pin 131 pivoted to the end of a link 132, the other end of which link is connected to the lower end of a lever 133 fixed to the agitator shaft 13. Levers 134 and 135 fixed to the shaft 12 and to the shaft 13 are provided with interfitting gear teeth so that as the lever 133 is rocked back and forth the shafts and agitator plates 17 and 18 carried thereby will be moved in opposite directions between the bars 8 of the hopper.

In operation, articles are placed in the hopper and agitated by the plates 17 and 18 so that they drop onto the bars 8 between the plates, the fingers 21 acting to prevent their jamming and allowing one article at a time to pass thereunder in each of the channels formed by the plates 17 and 18. The articles follow down through their respective channels onto the belt C and the belt being moved intermittently, carries them through the gradually narrowing and converging channels formed by the guide plates 27. As they emerge from the ends of the channels in groups or rows they are delivered onto the table T and the endmost articles of each group are acted upon by the members 35 which are moved apart by the operating mechanism and moved towards one another by the spring. The action of the members 35 is such as will press the articles into closely stacked relation and the groups or stacks being urged forwardly by the belt C in a step by step manner are delivered into a pocket of the receiving wheel which also rotates in a step by step manner. The stacks of articles in the wheel may be inspected or removed therefrom if it is desired for packing or the like, or they may be delivered thereby into a pocket P on the ends of arms A of a wrapping wheel W as shown.

It will be noted that the apparatus is arranged to sort the articles so that they lie edgewise in a plurality of channels which gradually narrow in width and converge at a point where the articles emerge from their respective channels in group formation at which point they are shifted towards one another to form an assembly of closely stacked articles suitable for packing or wrapping as may be desired.

We are aware that many changes may be made in the form of the invention without departing from the scope thereof and we prefer to be limited by the appended claims rather than by the foregoing description.

What we claim is:

1. An apparatus for sorting articles in stacked relation comprising in combination, a hopper including a plurality of spaced articles supporting bars, agitating plates between said bars, the plates between alternate bars being arranged in separate groups and adapted for an up and down movement in opposite directions, and a group of independently movable agitating members between said plates movable in a direction transversely to that of the said plates.

2. An apparatus for assembling articles in stacked relation comprising in combination, a hopper including means for sorting articles, a receiver for receiving a stack of articles and a chute between said hopper and receiver including a plurality of articles supporting bars and articles separating guide bars arranged to form gradually narrowing channels converging towards the said receiver.

3. An apparatus for assembling articles in stacked relation comprising in combination, a hopper including means for sorting articles, a receiver for receiving a stack of articles, a chute between said hopper and said receiver including a plurality of articles separating guide bars, and a belt beneath said bars for supporting said articles and feeding them therealong into said receiver.

4. An apparatus for assembling articles in stacked relation comprising in combination, a hopper for sorting articles, a receiver for receiving a stack of articles, a chute between said hopper and receiver including a plurality of article supporting and article guide bars adjacent said hopper, the said guide bars being arranged to form gradually narrowing channels converging towards said receiver, and a belt beneath said guide bars between said supporting bars and receiver for conveying articles along said channels.

5. An apparatus for assembling articles in stacked relation comprising in combination, a hopper for sorting and receiving a stack of articles, a chute between said hopper and receiver including a plurality of spaced guides forming gradually narrowing article guide channels which converge towards said receiver, a belt underlying said channels for urging articles therealong, and movable side guides at the sides of said chute between the receiver and the end of said chute movable towards and away from one another for engaging the endmost articles of a stack for urging the articles into closely stacked relation.

6. An apparatus for assembling articles in stacked relation comprising in combination, means for sorting articles and for delivering groups of articles, a support for receiving groups of articles having movable side walls for embracing the endmost articles of a group and adapted to move said articles into closely stacked relation, and a movable stack receiver having a pocket for receiving a stack of articles.

7. An apparatus for assembling articles in stacked relation comprising in combination, a hopper including a plurality of spaced article supporting bars, agitating plates between said bars for sorting articles, a chute extending from said hopper including article supporting bars and spaced guide bars, means for transporting articles therefrom including spaced guide bars arranged to form gradually narrowing separate channels and a belt movable therebelow for supporting articles in said channels, and a receiver for receiving stacks of articles.

8. An apparatus for assembling articles in stacked relation comprising in combination, a hopper including a plurality of spaced article supporting bars, agitating plates between said bars for sorting articles, a chute extending from said hopper including article supporting bars and spaced guide bars, means for transporting articles therefrom including spaced guide bars arranged to form gradually narrowing separate channels and a belt movable therebelow for supporting articles in said channels, and a receiver for receiving stacks of articles, the walls of said chute adjacent said receiver being movable towards and away from one another for acting on the endmost article of a group to move them into closely stacked relation.

9. An apparatus for sorting articles comprising in combination, a hopper, a plurality of spaced slanting article supporting bars within the hopper, article agitating plates reciprocable vertically between the supporting bars and forming side guides for the rows of articles upon the supporting bars, and reciprocable agitating fingers entering between the agitating plates to form with the plates and the supporting bars a discharge opening from the hopper.

10. An apparatus for sorting articles comprising in combination, a hopper, a plurality of spaced slanting article supporting bars within the hopper, article agitating plates reciprocable vertically between the supporting bars and forming side guides for the rows of articles upon the supporting bars, fingers entering between the agitating plates to define an exit from the hopper, and article separating plates abutting the ends of the agitating plates to preserve the separation of the articles after the articles leave the hopper, the separating plates and the agitating plates being so formed as to preserve their abutting relation during the reciprocation of the agitating plates.

11. An apparatus for assembling articles in stacked relation comprising in combination, a hopper for sorting articles, a receiver for receiving a stack of articles, a chute between the hopper and the receiver including a plurality of article separating plates cut away progressively from the outer plates to the inner plates, and converging side guides positioned to compress the stack of articles lengthwise as the articles are progressively released by the separating plates.

12. An apparatus for arranging on edge in orderly rows articles supplied in indiscriminate arrangement, comprising a hopper for receiving the articles initially, a plurality of spaced article supporting bars within the hopper serving as guideways for the edges of the articles, two sets of alternately arranged article agitating plates reciprocable vertically between the supporting bars and extending above the bars to serve as guides for holding the articles on edge, and means for reciprocating all the plates of each set simultaneously with the two sets in out of phase relation.

13. An apparatus for arranging and delivering on edge in orderly rows thin cylindrical articles supplied in indiscriminate arrangement, comprising a hopper for receiving the articles initially, a plurality of spaced slanting article supporting bars within the hopper serving as guideways upon which the articles may roll on edge, two sets of alternately arranged article agitating plates reciprocable vertically between the supporting bars and extending above the bars to serve as guides for holding the articles on edge, and a passage leading out of the hopper at the lower end of the slanting supporting bars, whereby the articles will align themselves upon the supporting bars and will pass out of the hopper by gravity.

In testimony whereof we have affixed our signatures.

WILLIAM VAUGHAN.
ARTHUR E. BROWN.

CERTIFICATE OF CORRECTION.

Patent No. 1,788,136.  Granted January 6, 1931, to

WILLIAM VAUGHAN ET AL.

It is hereby certified that error appears in the printed specification of the above numbered patent requiring correction as follows: Page 2, lines 102 and 103, strike out the words "the table T and are in alignment with the"; page 4, lines 41 and 42, claim 1, lines 55 and 56, claim 2, and line 64, claim 3, for the word "articles" read article; and that the said Letters Patent should be read with these corrections therein that the same may conform to the record of the case in the Patent Office.

Signed and sealed this 27th day of January, A. D. 1931.

M. J. Moore,
Acting Commissioner of Patents.

(Seal)